INVENTOR.
NILS HOGLUND

May 17, 1960 N. HOGLUND 2,936,750
APPARATUS FOR FORMING CONTOURS
Filed Jan. 13, 1958 6 Sheets-Sheet 2

INVENTOR.
NILS HOGLUND
BY
William A. Zabock
ATTORNEY

May 17, 1960

N. HOGLUND 2,936,750

APPARATUS FOR FORMING CONTOURS

Filed Jan. 13, 1958

INVENTOR.
NILS HOGLUND
BY William A Zulesak
ATTORNEY

May 17, 1960 N. HOGLUND 2,936,750
APPARATUS FOR FORMING CONTOURS
Filed Jan. 13, 1958 6 Sheets-Sheet 4
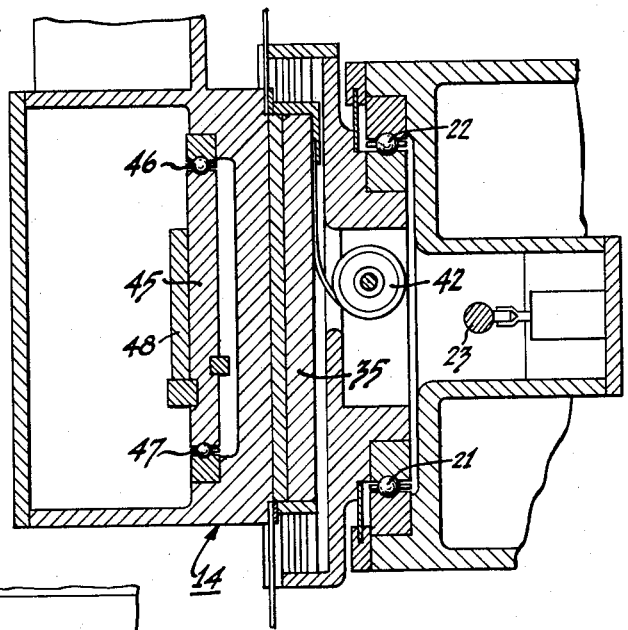
Fig.4.
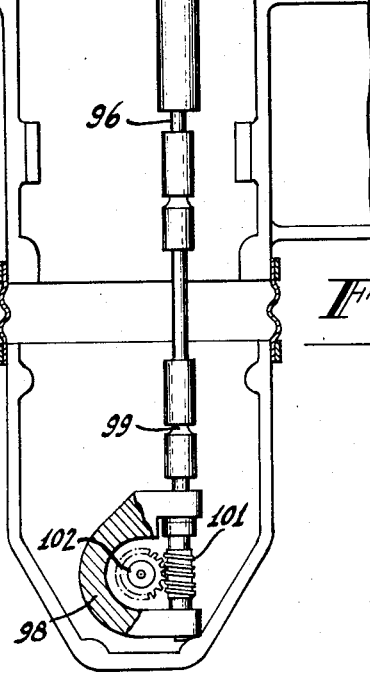
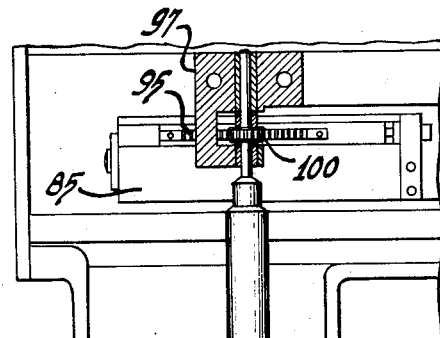
Fig.8.
INVENTOR.
NILS HOGLUND
BY
William G. Zalesak
ATTORNEY

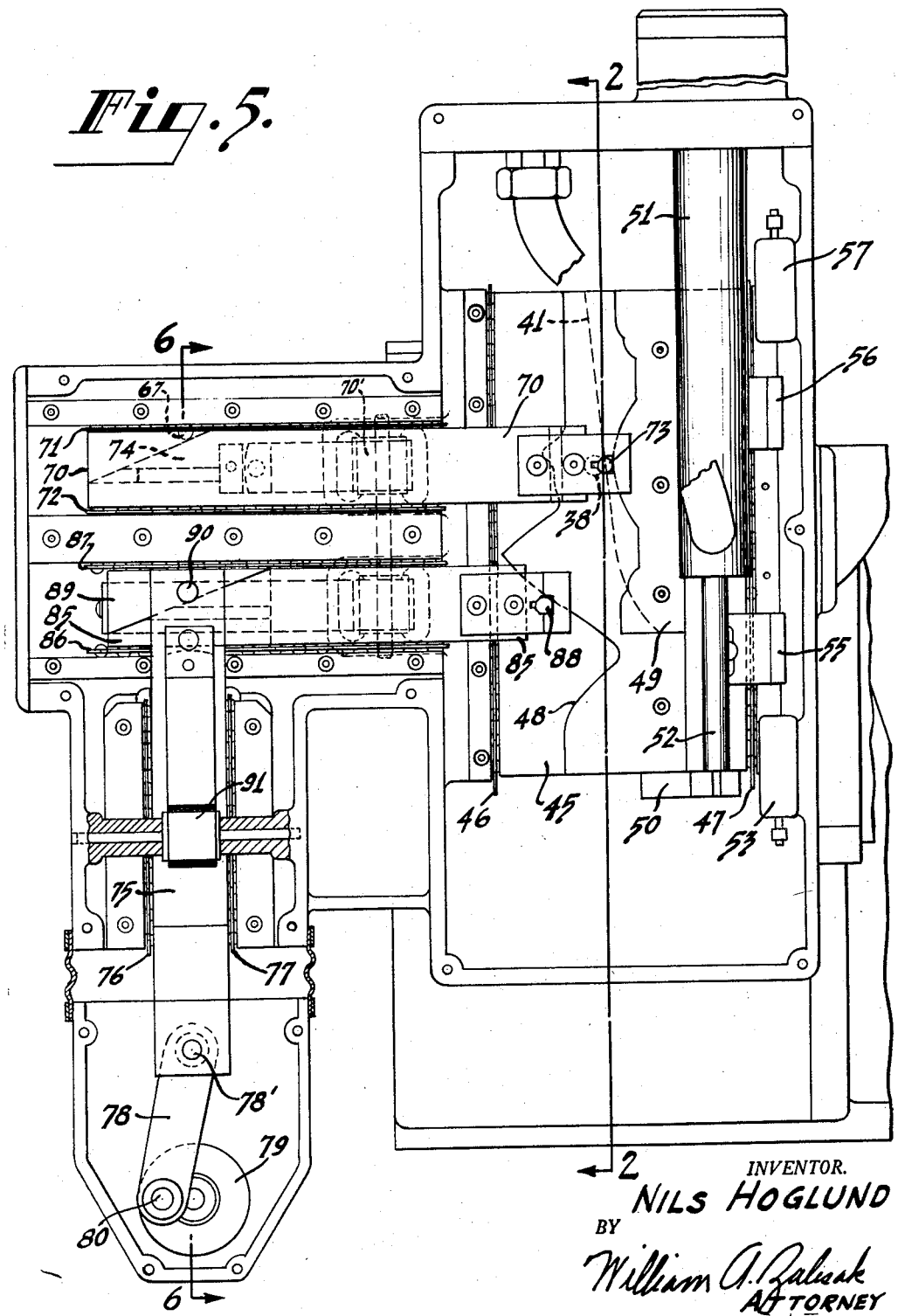

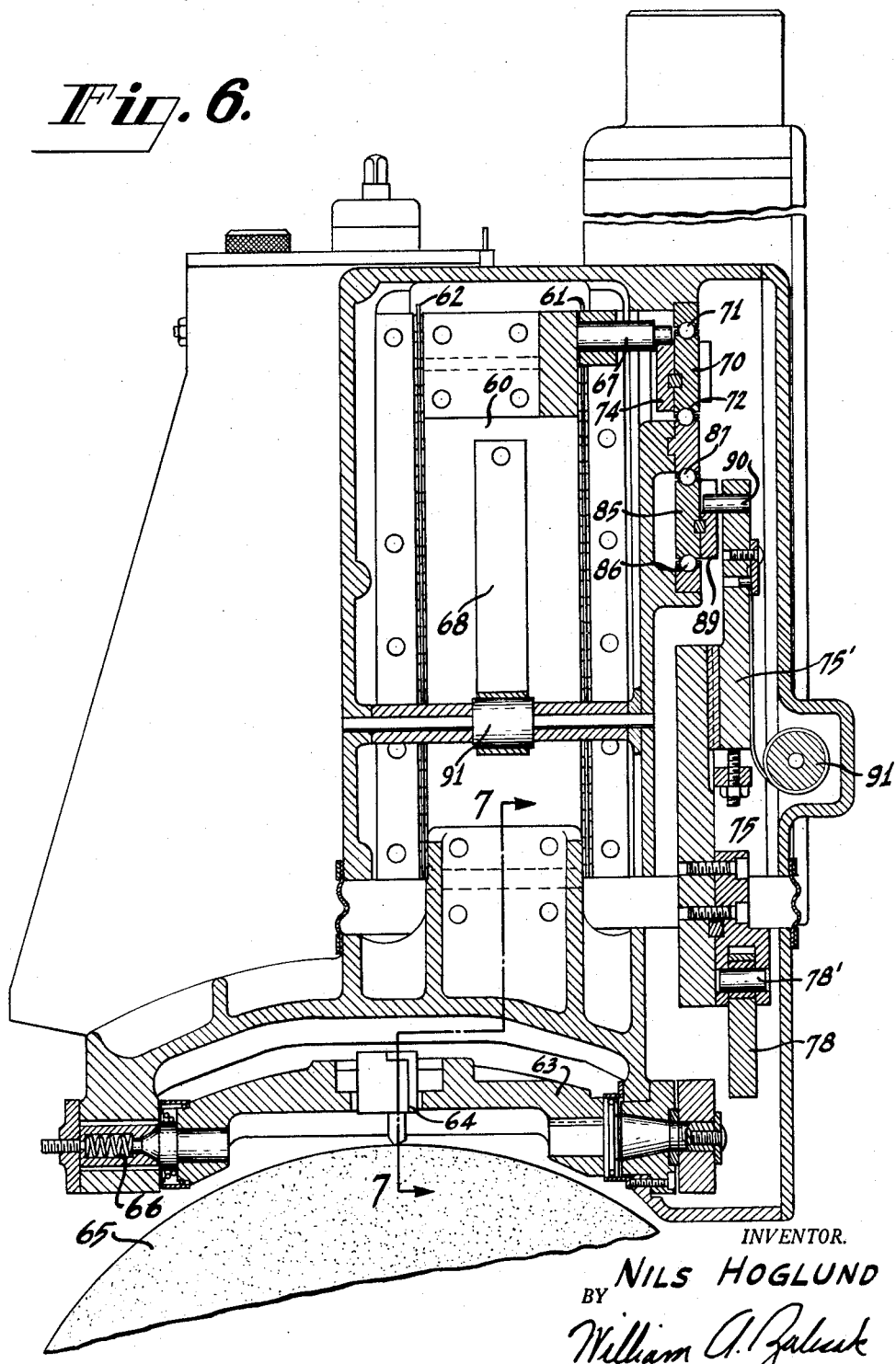

United States Patent Office 2,936,750
Patented May 17, 1960

2,936,750

APPARATUS FOR FORMING CONTOURS

Nils Hoglund, Summit, N.J.

Application January 13, 1958, Serial No. 708,560

11 Claims. (Cl. 125—11)

My invention relates to a grinding wheel dressing mechanism.

Wheel dressing apparatus is available for moving a dressing tool transversely of and radially of a grinding wheel. However, for all practical purposes, there is not available an apparatus that is capable of accurately and continuously controlling rotation of the dressing tool as it goes through its dressing cycle. The effectiveness of this third motion is that even though the profile of the surface to be dressed is such that a conventional diamond tool cannot practically enter into it, it is possible by rotating the diamond tool while in different positions to enter into this type of profile.

With the usual dresser, where the profile required on the grinding wheel has to be extremely accurate, the accuracy might easily be affected by the diamond wear as different points of the diamond would normally be dressing the contour. This is especially true when a true radius has to be generated, since a two coordinate movement without rotation of the diamond would present different points of the diamond at all the different points of the radius. To avoid this the diamond dressing tool must be rotated as it goes around a center of rotation so that the same point of the diamond is presented to the surface being dressed.

It is therefore an object of my invention to provide a wheel dressing apparatus of improved design which is capable of accurately dressing surfaces including surfaces of curvature.

It is a further object of my invention to provide such an apparatus in which the wearing of the dressing tool is prevented from affecting the accuracy of the dressing apparatus.

More specifically it is an object of my invention to present the same cutting point of the dressing tool to the surface being dressed regardless of contour.

Apparatus made according to my invention includes a base fixed to the grinding wheel apparatus. A slide on this base which can be indexed vertically or radially of the axis of the wheel being dressed, either manually or automatically, slidably supports a housing for transverse movement.

The housing, with its extension, supports a main slide on which are mounted the feed cam for controlling transverse movement of the housing, contour cam and pivot cam for rotating the tool support. In another part of the housing are supported the tool slide and in accordance with my invention a pivot slide connected to the rotatable tool support on the tool slide and having relative parallel movement to the tool slide for rotating a pivoted tool support mounted on the tool slide.

Connected between the contour and pivot cams on the main slide are ratio cam slides which are connected to and control the vertical movements of the tool and pivot slides and their relative movements for causing rotation of the tool support as the housing moves across the surface of the wheel being dressed that is parallel to the axis of rotation of the wheel.

The invention is explained in more detail in the following specification with reference to the accompanying sheets of drawings, wherein:

Figure 2a is a top view with cover removed of the infeed screw mechanism shown in Figure 2;

Figure 3 is a transverse section taken along the line 3—3 of Figure 2;

Figure 4 is a section taken along the line 4—4 of Figure 2;

Figure 5 is a front elevation of Figure 2 with the cover removed and parts broken away to show details of construction;

Figure 6 is a vertical section taken along the line 6—6 of Figure 5;

Figure 7 is a vertical section taken along the line 7—7 of Figure 6; and

Figure 8 shows a modification of the bow or pivoted tool support operating mechanism shown in Figure 5.

GENERAL DESCRIPTION

Figure 1:
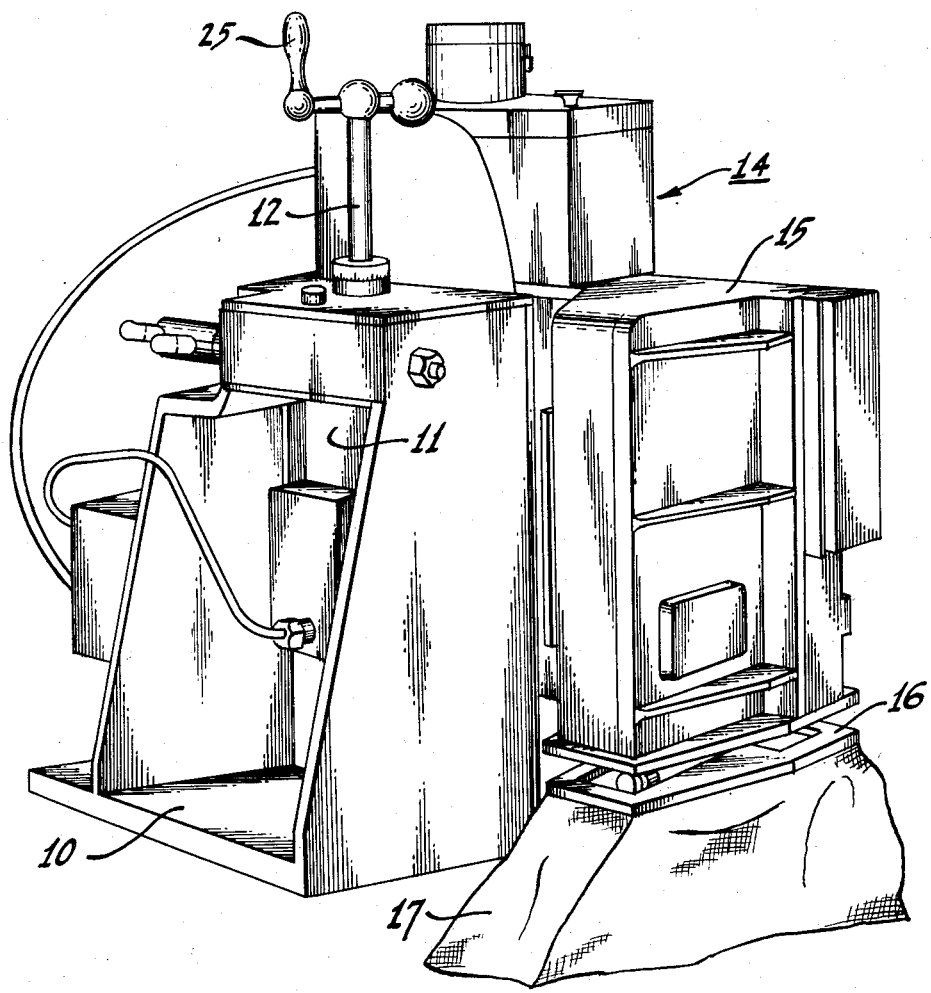
Figure 1 is a side perspective view showing the tool end of apparatus made according to my invention.
Figure 2:
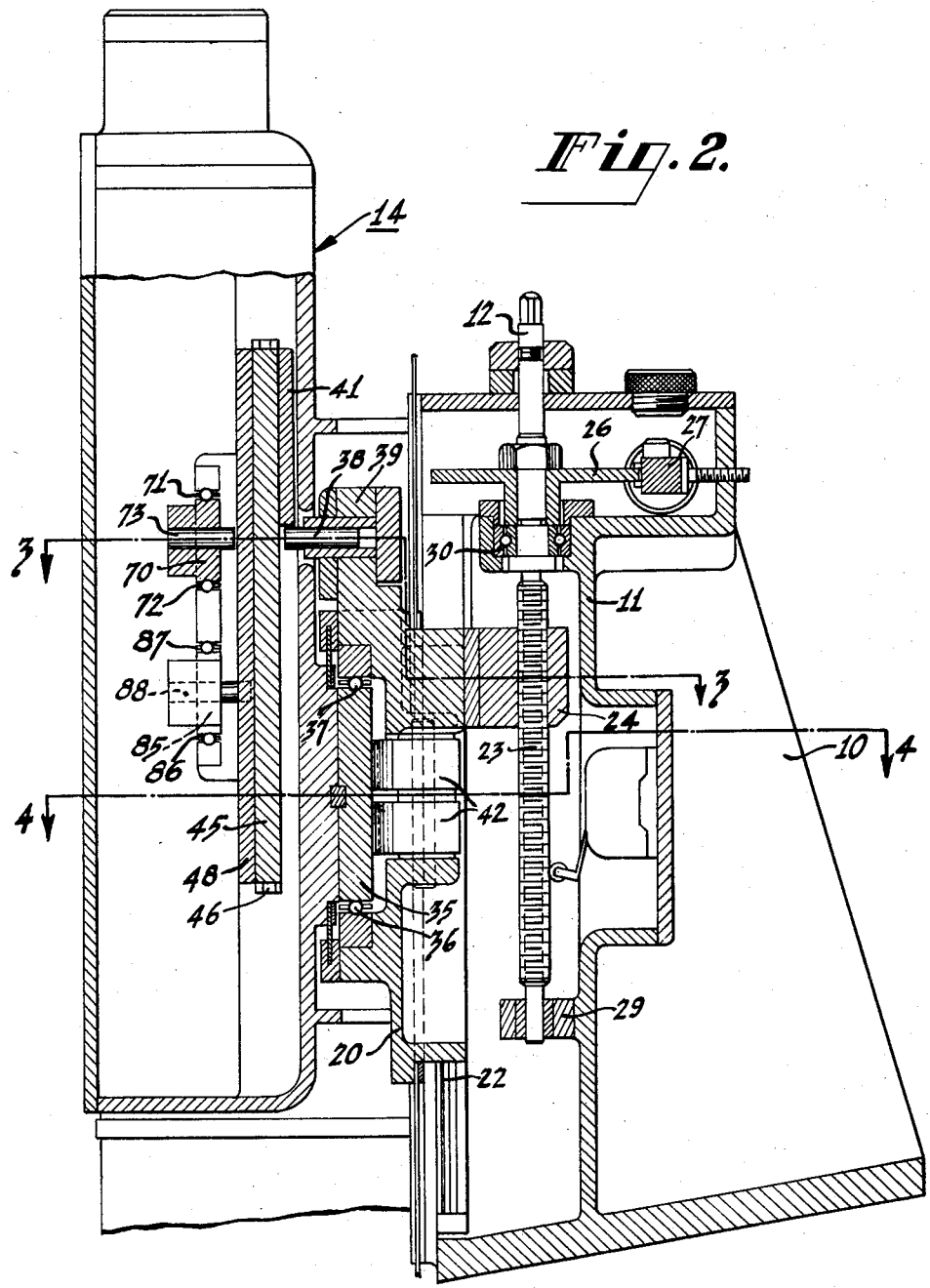
Figure 2 is a vertical section taken along the line 2—2 of Figure 5.

Referring to Figure 1, apparatus made according to my invention includes a base 10, which is normally mounted on the grinding wheel apparatus adjacent the grinding wheel. The base 10 is provided with a housing portion 11, within which is mounted an infeed slide to be described which can be moved vertically, automatically or manually by means of the adjusting screw 12 extending within the housing and connected to an infeed slide. The infeed slide supports a housing slide, to be described, which moves transversely of the infeed slide and supports the main housing 14 having a portion 15 in which is mounted the tool slide, to be described, supporting the tool assembly 16 covered by means of the dust cover 17. The main slide supporting the feed cam, contour cam, pivot cam and associated slides all to be described for controlling the transverse movement of the housing 14 and tool assembly 16 are mounted within the main portion of the housing 14. The tool and pivot slides are mounted in the portion 15 of the housing.

With the arrangement described, after the infeed slide is indexed by the infeed screw 12, the main slide, hydraulically operated, causes the housing 14 to move parallel to the axis of the wheel being dressed. As this action takes place the tool slide carrying the tool assembly moves radially of the wheel being dressed, while other mechanism causes the diamond dressing tool to rotate about its axis during its passage over the surface of the grinding wheel.

*Housing support and infeed mechanism*

(Figs. 2, 2a, 3 and 4)

Mounted within the housing 11 is the infeed slide 20 slidably mounted in bearing assemblies 21, 22 so that the infeed slide which supports the housing 11 can be moved vertically or radially of the wheel being dressed.

The slide 20 is connected to the infeed screw 23 by means of the nut 24 on slide 20. The slide can be adjusted manually by means of crank 25 (Fig. 1) connected to screw 12 or automatically by the ratchet mechanism including ratchet wheel 26 and dog 27 hydraulically operated by means of the piston 28 which is automatically controlled by means not shown.

The infeed screw 23 is rotatably supported at its lower end in the bearing 29, and at its upper end by upper bearing 30. The housing and infeed slide are supported on the infeed screw 23 and bearings 21, 22. As the screw is rotated, the nut 24 moves up or down positioning the infeed slide 20 and housing 14 vertically.

The housing 14 is mounted on the housing slide 35 slidably supported by bearing assemblies 36, 37. The housing 14, 15 is mounted on the slide 35. The infeed slide 20 has mounted at the upper end thereof the follower pin 38, mounted in the adjustable slide 39, and adjusted by means of lead screw 40. The follower pin is maintained in contact with the feed cam 41 by means of the biasing springs 42. As will be described below, as the infeed slide moves up and down, the housing 14, 15 and housing slide 35 will move transversely of the base as the follower 38 rides along the feed cam 41, the biasing springs 42 urging the housing to the right (Figs. 3, 5) and the follower 38 against the cam 41.

Main, ratio and pivot cam slides (Figs. 2, 3, 4 and 5)

Mounted within the main portion of the housing 14 is the main slide which carries on one face the feed cam controlling the movement of the housing transversely of the base and on the other side the contour and pivot cams controlling the movement of the dressing tool radially of the wheel being dressed and the rotation of the tool support, by means of additional slides having followers in contact with the contour and pivot cams and connections to the tool slide and pivot slide.

The main slide 45 is slidably mounted in bearing assemblies 46, 47. Mounted thereon are the feed cam 41, the pivot cam 48 and the contour cam 49. The main slide 45 is connected by the block 50 with the piston cylinder 51 by piston rod 52. This last is hydraulically operated and automatically controlled by means of the micro switches 53, 54 and dogs 55, 56 carried on the slide 45. The hydraulically operated piston moves the slide 45 vertically.

Tool slide and support (Figs. 3, 5, 6 and 7)

The diamond dressing tool is slidably supported by the housing extension 15. The tool slide which moves vertically, that is radially, of the wheel being dressed, has at its lower end a pivoted bow support for supporting the tool proper. Other means are provided for rotating the tool support.

Referring now to Figures 3 and 6, the tool slide 60 is slidably mounted in bearing assemblies 61 and 62. Pivotally mounted at its lower end is the bow shaped member 63, supporting the diamond dressing tool 64 in contact with the wheel 65 being dressed. The bow or tool support is spring loaded by means of spring 66. At the upper end of the slide is supported a follower 67 which contacts a ratio cam to be described for controlling the vertical movement of the tool slide 60. The follower 67 is maintained in contact with the cam by means of the biasing spring 68.

Movement of the tool slide 60 is controlled by means of a connecting slide 70 (Figures 3, 4, 5 and 6) slidably mounted in bearing assemblies 71, 72. Mounted at one end of the slide is the follower 73 which contacts the contour cam 49 on the main slide 45. A ratio cam 74 is mounted on the other end of the slide. The follower 67 on the tool slide is in contact with this cam 74. Follower 73 is kept in contact with the cam 49 by means of the biasing spring 70 connected between the housing 15 and slide 70.

As the main slide 45 moves up and down the ratio slide 70 moves transversely thereof causing the tool slide to move up and down parallel to the main slide, that is radially of the wheel being dressed.

Pivot control (Figs. 4, 5 and 6)

Mounted within housing extension 15 and to one side of the tool slide is the bell crank slide 75, slidably mounted in the bearing assemblies 76, 77. At the lower end of slide 75 is pivotally mounted by means of pin 78' the bell crank 78. The crank is connected to crank disc 79 by pin 80. The disc 79 is fixed to the pivoted bow member 63. As the slide 75 moves up and down, crank 78 rotates disc 79 and tool support 63.

Connected between the main slide 45 and the pivot slide 75 is the ratio slide 85, slidably mounted in the bearing assemblies 86, 87. Mounted at one end of slide 85 is the follower 88 in contact with the pivot cam 48. At the other end of the slide 85 is supported the ratio cam 89 in contact with the follower 90 mounted at the upper end of bell crank slide 75. Follower 90 supported on slide 75' is maintained in contact with ratio cam 85 by means of the biasing spring 91.

As the main slide 45 moves up and down, the ratio slide 85 moves transversely thereof causing the pivot slide to move vertically or parallel to the main slide. This causes the bell crank 78 to rotate.

Where the contour of the grinding wheel to be dressed does not require the bow support 63 to be rotated, ratio slides 70 and 85 are caused to move together by properly designing cams 48 and 49 on the main slide. However, differential movement between the slides 70 and 85 will cause rotation because the tool slide 60 and pivot slide 75 will have relative movement with respect to each other thus causing the movement of crank 78 and disc 79 and hence rotation of the tool support 63.

In Figure 8, I show a modification of the mechanism for rotating the tool bow support. The slide and crank have been replaced by gear and rack mechanism.

Instead of the ratio cam 85 mounted on the slide 85, I mount a rack 95 on slide 85. A shaft 96 is supported in bearings 97, 98 and is provided with a universal 99 to compensate for misalignment. The shaft supports at its upper end and in contact with the rack 95 the pinion 100. At the lower end is mounted the worm gear 101 engaging the gear 102 fixed to the support 63. As slide 85 moves back and forth rack 95 and gear 100 cause shaft 96 to rotate as well as worm gear 101 and gear 102 thus rotating the tool support.

What is claimed is:

1. A contour forming tool assembly including a housing movable in one direction, a tool slide movable transversely of said one direction, a pivoted tool support mounted at one end of said tool slide, a second slide movable parallel to said tool slide, and connections between one end of said second slide and said pivoted support for rotating said pivoted support, means including a plurality of slides for controlling differential movement of said tool and said second slides, and cam and follower means connected between said tool and said second slides and said plurality of slides for determining relative movement of said tool and second slides and means for controlling movement of said plurality of slides including a main slide and cam and follower connections between said main slide and said plurality of slides for controlling movement of said plurality of slides.

2. A contour forming tool assembly including a housing movable in one direction, a tool slide movable transversely of said one direction, a pivoted tool support mounted at one end of said tool slide, a second slide movable parallel to said tool slide, and connections between one end of said second slide and said pivoted support for rotating said pivoted support, means including a plurality of slides for controlling differential movement of said tool and said second slides, and cam and follower means connected between said tool and second slides and said plurality of slides for determining relative movement of said tool and second slides and means for controlling movement of said plurality of slides including a main slide and cam and follower connections between said main slide and said plurality of slides for controlling movement of said plurality of slides, and connections between said main slide and said base for controlling movement of said housing in said one direction.

3. A contour forming tool assembly including a housing movable in one direction, a tool slide on said housing movable transversely of said one direction, a second slide on said housing movable parallel to said tool slide, a tool support pivotally mounted on said tool slide, connections between said second slide and said pivoted tool support for rotating said tool support, third and fourth slides mounted on said housing movable parallel to each other and said one direction, a cam mounted on said third slide and a cam mounted on said fourth slide, a follower mounted on said tool slide contacting the cam on one of said third and fourth slides for controlling movement of said tool slide, and a cam follower mounted on said second slide and contacting the cam on one of said third and fourth slides and means on said housing for controlling movement of said third and fourth slides, the relative movement of said third and fourth slides determining rotation of said tool support as said tool slide moves relative to said housing.

4. A contour forming tool assembly including a housing movable in one direction, a first slide on said housing movable transversely of said one direction, a second slide on said housing movable parallel to said first slide, a tool support pivotally mounted on said first slide, connections between said second slide and said pivoted tool support for rotating said tool support, third and fourth slides mounted on said housing movable parallel to each other and said one direction, a cam mounted on said third slide and a cam mounted on said fourth slide, a follower mounted on said first slide contacting the cam on one of said third and fourth slides for controlling movement of said first slide, and a cam follower mounted on said second slide and contacting the cam on one of said third and fourth slides and means on said housing for controlling movement of said third and fourth slides, the relative movement of said third and fourth slides determining rotation of said tool support as said tool slide moves relative to said housing.

5. A contour forming tool assembly including a housing movable in one direction, a first slide mounted on said housing and movable transversely of said one direction, a second slide mounted on said housing and movable parallel to said first side, a tool support pivotally mounted on said first slide and connections between said second slide and said pivoted support for rotating said pivoted support, third and fourth slides mounted on said housing movable parallel to the movement of said housing, cam and follower connections connected between said first and one of said third and fourth slides and cam and follower connections connected between said second slide and the other of said third and fourth slides, a main slide mounted on said housing movable parallel to said first slide, cam and follower connections between said main slide and said third and fourth slides for controlling movement of said third and fourth slides and hydraulic pressure operated means connected to said main slide for operating said main slide.

6. A contour forming tool assembly including a housing movable in one direction, a first slide mounted on said housing and movable transversely of said one direction, a second slide mounted on said housing and movable parallel to said first slide, a tool support pivotally mounted on said first slide and connections between said second slide and said pivoted support for rotating said pivoted support, third and fourth slides mounted on said housing movable parallel to the movement of said housing, cam and follower connections connected between said first and one of said third and fourth slides and cam and follower connections connected between said second slide and the other of said third and fourth slides, a main slide mounted on said housing movable parallel to said first slide, cam and follower connections between said main slide and said third and fourth slides for controlling movement of said third and fourth slides and means connected to said main slide for operating said main slide.

7. A grinding wheel apparatus including a base, a slide on said base, means for moving said slide, a housing on said slide and movable in one direction, a tool slide mounted on said housing and movable transversely of said one direction, a second slide mounted on said housing and movable parallel to said tool slide, a tool support pivotally mounted on said tool slide and connections between said second slide and said pivoted support for rotating said pivoted support, third and fourth slides mounted on said housing movable parallel to the movement of said housing, cam and follower connections connected between said first and one of said third and fourth slides and cam and follower connections connected between said second slide and the other of said third and fourth slides, a main slide mounted on said housing movable parallel to said tool slide, cam and follower connections between said main slide and said third and fourth slides for controlling movement of said third and fourth slides and means connected to said main slide for operating said main slide.

8. A grinding wheel apparatus including a base, a slide on said base, means for moving said slide, a housing on said slide and movable in one direction, a tool slide mounted on said housing and movable transversely of said one direction, a second slide mounted on said housing and movable parallel to said tool slide, a tool support pivotally mounted on said tool slide and connections between said second slide and said pivoted support for rotating said pivoted support, third and fourth slides mounted on said housing movable parallel to the movement of said housing, cam and follower connections connected between said first and one of said third and fourth slides and cam and follower connections connected between said second slide and the other of said third and fourth slides, a main slide mounted on said housing movable parallel to said tool slide, cam and follower connections between said main slide and said third and fourth slides for controlling movement of said third and fourth slides and hydraulic pressure operated means connected to said main slide for operating said main slide.

9. A grinding wheel dressing apparatus including a base, a housing on said base movable in two directions, a first slide mounted on said housing and movable in one direction, a second slide mounted on said housing and movable parallel to said first slide, a tool support pivotally mounted on said first slide and connections between said second slide and said pivoted support for rotating said pivoted support, third and fourth slides mounted on said housing movable parallel to the movement of said housing, connections between said first and second slides and said third and fourth slides, a main slide mounted on said housing movable parallel to said first slide, cam and follower connections between said main slide and said third and fourth slides for controlling movement of said third and fourth slides, and means connected to said main slide for operating said main slide.

10. A grinding wheel dressing apparatus including a housing movable in one direction, a tool slide on said housing movable transversely of said one direction, a second slide on said housing movable parallel to said first slide, a tool support pivotally mounted on said tool slide, connections between said second slide and said pivoted tool support for rotating said tool support, other slides mounted on said housing movable parallel to each other and said one direction and having connections with said tool and second slides, means on said housing connected to said other slides for controlling movement of said other slides, relative movement of said other slides determining rotation of said tool support as said tool slide moves relative to said housing.

11. A grinding wheel dressing mechanism including a base, a housing slide mounted on said base, a housing mounted on said base and movable in one direction, a tool slide on said housing movable transversely of said one direction, a second slide on said housing movable parallel to said first slide, a tool support pivotally mounted on said first slide, connections between said second slide and said pivoted tool support for rotating said tool support, other slides mounted on said housing movable parallel to each other and said one direction and having connections with said tool and second slides, means on said housing connected to said other slide for controlling movement of said other slides, relative movement of said other slides determining rotation of said tool support as said tool slide moves relative to said housing.

References Cited in the file of this patent

UNITED STATES PATENTS

| | | |
|---|---|---|
| 2,333,985 | Clark | Nov. 9, 1943 |
| 2,472,975 | Houghtaling | June 14, 1949 |
| 2,477,135 | Marker et al. | July 26, 1949 |